(12) United States Patent
Sanzo

(10) Patent No.: US 12,310,301 B2
(45) Date of Patent: *May 27, 2025

(54) HYDROPONIC SYSTEM FOR USE IN A DESERT-LIKE ENVIRONMENT

(71) Applicant: Michael A. Sanzo, Fernandina Beach, FL (US)

(72) Inventor: Michael A. Sanzo, Fernandina Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/824,117

(22) Filed: Sep. 4, 2024

(65) Prior Publication Data

US 2024/0423145 A1  Dec. 26, 2024

Related U.S. Application Data

(63) Continuation of application No. 18/642,705, filed on Apr. 22, 2024.

(60) Provisional application No. 63/461,907, filed on Apr. 25, 2023.

(51) Int. Cl.
*A01G 9/24* (2006.01)
*A01G 27/00* (2006.01)
*A01G 31/02* (2006.01)

(52) U.S. Cl.
CPC ............ *A01G 31/02* (2013.01); *A01G 9/241* (2013.01); *A01G 27/005* (2013.01)

(58) Field of Classification Search
CPC .. A01G 31/02; A01G 31/00; A01G 2031/006; A01G 9/241; A01G 27/005; A01G 9/18; A01G 9/24; A01G 9/242; A01G 31/06
See application file for complete search history.

(56) References Cited

U.S. PATENT DOCUMENTS

| | | | |
|---|---|---|---|
| 3,063,195 A | * | 11/1962 | Ravich ................ A01G 9/18 47/17 |
| 3,660,933 A | | 5/1972 | Wong, Jr. |
| 3,667,157 A | | 6/1972 | Longhini |
| 3,766,684 A | | 10/1973 | Kato |
| 3,991,514 A | | 11/1976 | Flinck |
| 4,021,964 A | | 5/1977 | Darwin et al. |
| 4,198,783 A | | 4/1980 | Leroux |
| 4,211,035 A | | 7/1980 | Small |
| 4,218,847 A | | 8/1980 | Leroux |
| 4,379,375 A | | 4/1983 | Eisenberg et al. |
| 4,419,842 A | | 12/1983 | Paloian |
| 4,951,416 A | | 8/1990 | Gutridge |
| 4,976,064 A | | 12/1990 | Julien |

(Continued)

FOREIGN PATENT DOCUMENTS

| | | | | |
|---|---|---|---|---|
| GB | 2516958 | | 2/2015 | |
| GB | 2516958 A | * | 2/2015 | ........... A01G 9/1415 |
| KR | 101969924 | | 4/2019 | |

OTHER PUBLICATIONS

U.S. Appl. No. 18/642,705, filed Apr. 22, 2024, Sanzo.

(Continued)

*Primary Examiner* — Kristen C Hayes
(74) *Attorney, Agent, or Firm* — Law Office of: Michael A. Sanzo, LLC

(57) ABSTRACT

The present invention is directed to hydroponic systems that can be used in an environment with large daily fluctuations in temperature and to the use of those systems for growing plants.

16 Claims, 4 Drawing Sheets

(56) References Cited

U.S. PATENT DOCUMENTS

| | | |
|---|---|---|
| 5,010,686 A | 4/1991 | Rivest |
| 5,394,647 A | 3/1995 | Blackford et al. |
| 5,440,836 A | 8/1995 | Lee |
| 5,533,299 A | 7/1996 | Kratky |
| 5,813,168 A | 9/1998 | Clendening |
| 5,887,383 A | 3/1999 | Soeda |
| 6,219,966 B1 | 4/2001 | Lapointe et al. |
| 6,247,268 B1 | 6/2001 | Auer |
| 7,832,144 B2 | 11/2010 | Corradi |
| 8,088,475 B2 | 1/2012 | Saski et al. |
| 8,621,782 B2 | 1/2014 | Buck et al. |
| 9,497,907 B2 | 11/2016 | Anderson |
| 9,655,309 B1 | 5/2017 | Hall et al. |
| 10,010,333 B2 | 7/2018 | Ardito et al. |
| 10,130,055 B2 | 11/2018 | Iwai |
| 10,219,447 B1 * | 3/2019 | DeCarli ............... B65D 88/005 |
| 10,499,574 B2 | 12/2019 | Lu et al. |
| 10,588,276 B2 | 3/2020 | Campau et al. |
| 10,602,686 B2 | 3/2020 | Taylor |
| 10,694,688 B2 | 6/2020 | Kitagawa |
| 10,736,275 B2 | 8/2020 | Lopez |
| 10,758,875 B2 | 9/2020 | Bang et al. |
| 10,791,686 B2 | 10/2020 | Zhan et al. |
| 10,869,436 B2 | 12/2020 | Warrick |
| 11,206,774 B2 | 12/2021 | Sperry et al. |
| 11,337,387 B2 | 5/2022 | Adams et al. |
| 11,344,852 B1 | 5/2022 | Hamler et al. |
| 11,363,761 B2 | 6/2022 | Neuhoff, Jr. |
| 12,127,515 B1 | 10/2024 | Sanzo |
| 2011/0067301 A1 | 3/2011 | DeMitchell et al. |
| 2015/0007495 A1 | 1/2015 | Tseng et al. |
| 2017/0245442 A1 | 8/2017 | Stewart |
| 2019/0335692 A1 | 11/2019 | Speetjens et al. |
| 2021/0076576 A1 | 3/2021 | Zapalac |
| 2022/0132761 A1 | 5/2022 | Stevenson |
| 2022/0174899 A1 | 6/2022 | Liang et al. |

OTHER PUBLICATIONS

Copending U.S. Appl. No. 19/181,308, filed Apr. 16, 2025. Since this application has not yet published, a pdf is enclosed herewith. Preliminary Amendment filed for copending U.S. Appl. No. 19/181,308 on Apr. 16, 2025. Since this has not yet published, a pdf is enclosed herewith.

\* cited by examiner

HYDROPONIC SYSTEM FOR USE IN A DESERT-LIKE ENVIRONMENT

CROSS REFERENCE TO RELATED APPLICATIONS

The present application is a continuation of U.S. Ser. No. 18/642,705, filed on Apr. 22, 2024, which claims the benefit under 35 USC § 119 (e) of U.S. provisional application 63/461,907, filed on Apr. 25, 2023. The content of these previous applications is incorporated herein by reference in its entirety.

FIELD OF THE INVENTION

The present invention is directed to hydroponic systems that can be used to grow plants in an environment marked by large daily fluctuations in temperature. This environment is typical of many deserts where it is hot during the day but cold at night due to the lack of groundwater.

BACKGROUND OF THE INVENTION

Traditional farming requires a location that provides sunlight, nutrient-rich soil, air, water, and lots of space. However, even when all of these things are present, crops can be destroyed by bad weather, drought, insects, and disease. Hydroponic systems have been known for many years and address most of these problems. Sunlight can, if necessary, be supplemented with grow lights, much less water is required, and nutrient levels can be measured and adjusted to promote good growth. In addition, limitations on space can be at least partially solved using vertical systems, and the risk of losses due to insects or disease can be substantially reduced.

Hydroponic systems used indoors are in environments where cold weather or rapid fluctuations in temperature are not a problem. However, this is not true of systems used outdoors. Hydroponic systems exposed to such conditions must have mechanisms for maintaining an internal environment conducive to plant growth. The present application is directed to hydroponic systems designed specifically for use in a desert-like area characterized by large daily fluctuations in temperature as well as extreme highs and lows.

SUMMARY OF THE INVENTION

The description below includes reference numeral identifiers that refer to elements in FIGS. 1-4. However, the identifiers are not intended to limit the invention to the elements specifically shown in the figures and have not been included in the claims.

A. First Hydroponic System

FIGS. 1 and 2 shows the components of a hydroponic system that comprises: a) a rectangular support structure with a bottom side (1), top side (2), side walls (3) and (4), front side (34) and back side (not numbered); b) movable panels ((5), (26), (36)) which are integrated into the outer surface of walls of the support structure and can move to an opened or closed position; c) an insect screen ((8), (30), (37)) affixed to the inner surface of a wall of the support structure to cover gaps ((6), (30), (37)) resulting from the opening of movable panels; d) top (9) and bottom (10) planar elements, in the form of light transmissible glass or plastic that are joined together to form a nutrient fluid channel (12) where nutrient fluid is warmed and aerated when movable panels (5) are open; e) one or more plant growth conduits (21) with openings (24) that support vessels for growing plants in a position where the leaves are exposed to sunlight transmitted through the nutrient fluid channel (12) and roots are exposed to nutrient fluid passing though channels (22) inside the conduits; f) a nutrient fluid reservoir (16); a pump (15) or pressurized tank for generating fluid flow and a battery (17) for providing electrical power.

Support Structure

The support structure has walls or sides (the terms being used synonymously) that are joined to form an enclosed space separate from the outside environment. In the systems shown in FIGS. 1-4, the support structure comprises four sides and two end walls forming a rectangular cuboid. Each wall has an interior surface, which abuts the internal enclosed space (28), and an opposite outer surface that abuts the outside environment. The exterior surfaces of the walls, e.g., (27), must be sturdy enough to sustain the environmental conditions where the support structure will be located, and the walls themselves preferably include insulating material between their outer and inner surfaces (29). The exact size of the internal enclosed space is not critical to the invention, but typical sizes include systems with a length of 3-10 feet, a width of 3-8 feet, and a height of 4-8 feet. A larger system may have a length of 5-15 feet, a width of 5-15 feet, and a height of 6-8 feet.

There must be a way to access the inner space so that a person growing plants can use the hydroponic equipment, monitor plant growth, check on the system's functioning, replenish nutrient fluid, and ultimately harvest the plants or the products produced by the plants. The opening must be scalable to help maintain an insulated inner environment of the system. For smaller systems, access may be provided by a hinged or slidable side of the support, a hatch, or other opening (34). Larger structures may have a door or other passageway allowing a person to enter the inner space. Any hatches, doors, or other structures permitting access to the internal area of the system should be insulated on their inner side.

Heating Panels

Moveable heating panels (5) are integrated into the outer surface of the wall of the support structure that receives the most sunlight (usually the top side (2)). These movable panels must be hinged (7) or otherwise engineered to open to form gaps (6) in the wall, allowing air and sunlight to be passed from the outer environment into the enclosed inner space of the support structure. Typically, the heating panels would be open when sunlight is available and the external atmosphere is relatively warm. The panels should be insulated on their inner surface, and when in a closed position, they should fit snuggly in the gap and integrate into the wall to seal the system from the outside environment. This might be accomplished by using panels with grooves that engage one another to form a seal.

Insect Screen

Beneath the areas of the wall in which gaps form due to the opening of a movable panel ((5) (26), (36)), there should be an insect screen ((8), (30), (37)) which is affixed to the inner surface of the wall. There may be a single insect screen positioned to cover all gaps or multiple screens, each covering one or several gaps. The screens should have a mesh that allows the passage of air and sunlight but prevents insects from passing from the outer environment into the inner closed space of the system. The insect screen will typically be metal or plastic and have a mesh with a pore width of 0.4-1 mm or a 2×20 mesh size. It may be attached to the wall using any means that results in attachment preventing the passage of insects. This includes adhesive, tape, tacks, staples, nails, etc.

Planar Elements Forming a Nutrient Fluid Channel

Beneath the insect screen, there is a top planar element (9) and a bottom planar element (10) that are joined, e.g., by a bracket at their ends ((13) and (14)). The sides of the joined planar elements should be connected by a barrier that is impermeable nutrient fluid so that, together with the top and bottom planar elements, a nutrient fluid channel (12) is formed. The planar elements must have high transmissibility for sunlight (e.g., at least 85%, and preferably at least 90 or 95%) and will typically be made of plastic (e.g., Plexiglas) or glass. The top planar element (9) will also be perforated with pores (11) to allow the passage of air. It will be positioned over the bottom planar element and beneath the insect screen. The planar elements will generally have a thickness of 0.5-3.0 cm, be parallel to one another, and be separated by a distance of 0.5-2.5 cm.

The nutrient fluid channel (12) has a fluid receiving end (13) and an opposite fluid dispensing end (14). These ends may be partially sealed and have one or more ports to facilitate fluid flow into and out of the channel. During operation, nutrient fluid is propelled, e.g., by a liquid pump (15), into the nutrient channel (12) at its fluid receiving end (13), flows through the channel (12) while being warmed by sunlight and aerated by air that has passed through gaps (6) created by the opening of panels (5), and then exits the nutrient channel (12) at the fluid dispensing end (14).

Plant Growth Conduits

After leaving the nutrient fluid channel, the nutrient fluid enters a descending nutrient fluid conduit (19), where it is directed to one or more plant growth conduits (21). These may have many shapes, but in FIGS. 1 and 2 are rectangular boxes. Optionally, in situations where there is more than one plant growth conduit, a manifold (20) will be present to evenly distribute nutrient fluid received from the descending nutrient fluid conduit to each channel (22) running through the plant growth conduits (21). Each plant growth channel (22) has a receiving end (the end receiving fluid from the manifold (20) or descending nutrient fluid conduit (19)) and an opposite dispensing end where nutrient fluid exits after traversing the channel. Along the surface of each plant growth conduit (usually the upper surface), there are openings (24) that can suspend or otherwise support pots or other vessels that contain plants and that maintain the plants in a position where they can receive sunlight that has passed through the nutrient flow channel. The plants are also positioned so that the roots extend into the plant growth channel (22), where, during the operation of the hydroponic system, they are contacted by the flowing nutrient fluid. The plant growth conduit's receiving and dispensing ends may optionally be partially sealed, and each end may have a port to facilitate fluid movement into and out of the channel. Upon exiting from the dispensing end of the plant growth channel, the nutrient fluid enters into one or more recovery conduits (25) which direct the fluid to a nutrient fluid reservoir (16).

Nutrient Fluid Reservoir and Pump

During operation, nutrient fluid in the nutrient fluid reservoir (16) feeds a battery (17) powered pump (15) that directs it through an ascending nutrient fluid conduit (18) to the receiving end of the nutrient fluid channel (13).

B. Additional Elements

In addition to the abovementioned elements, the system can be modified by adding one or more movable reflective panels (26) in a wall other than the top. Reflective panels (26) like the top panels (5) also heat the system's interior but do so differently. When in the open position, the top panels (5) allow sunlight to pass through the gap (6) and warm nutrient fluid in the nutrient fluid channel (12). The reflective panels are located on the sides of the support, and their inner surface (31) is coated with a reflective coating, e.g., a mirror, mylar or metal coating. When opened at an appropriate angle (e.g. 20-50 degrees) these panels reflect sunlight into the system's interior, where it may optionally contact and warm either the nutrient fluid in the ascending or descending fluid conduit or a column (32) or container of heat-absorbing fluid. An advantage of having a separate column or container is that the material that it contains may be chosen solely for its heat absorption and heat transfer characteristics, whereas nutrient fluid must always comprise nutrients and water that the plants need for growth.

If desired, multiple reflective panels may be used in different positions and on different walls. For example, a reflective panel could be used on wall (4) and heat nutrient fluid in the descending nutrient fluid conduit (19). When sunlight is limited and temperatures cool (e.g., at night), the reflective panels and the heating panels at the top (5) should close to limit heat loss from the system's interior. Also, like the panels in the top wall, the reflective panels should have insulation material integrated between their outer and inner surfaces (29). All inner walls should be fully insulated when the movable panels are closed.

As an alternative to manually moving panels, a thermostat may be present in the hydroponic system that monitors temperature either inside or outside of the system and, in response to selected temperatures, activates one or more electrical circuits controlling the opening and closing of movable panels.

Optionally, an air pump may be used to oxygenate the fluid in the nutrient fluid reservoir and, if desired, the fluid pump can be replaced with a pressurized tank to propel fluid. This may be desirable when a user wants to minimize the electricity needed to run the system.

C. Alternative Hydroponic System

As shown in FIG. 2, the hydroponic system can be designed to both keep plants warm as discussed above and also to cool the inner space of the structural support if it gets too hot. In this system, all movable panels may be electronically controlled with opening and closing depending on temperature readings from the thermostat (33). In addition to the top panels and reflective panels discussed above, this system has one or more movable cooling panels (36), preferably located on a side. These differ from reflective panels because they do not have a light-reflective inner surface. In addition, they differ from the movable top panels (5) with respect to where they are located and when they should be opened and closed. Specifically, heating panels are positioned to receive direct sunlight or are positioned to reflect light into the system. They generally open when the inner system needs warming. Conversely, cooling panels should be placed where they receive less direct sunlight, do not have a reflective surface, and should generally be open when the internal system needs cooling.

The system would operate as follows: At a first temperature, e.g., 70° F. or higher, one or more top panels and, optionally, one or more reflective panels are opened to warm the interior of the hydroponic system and to expose plants to sunlight. At a second temperature, different from the first (e.g., 65 degrees or lower), heating panels and reflective panels are closed to insulate the interior of the hydroponic system. At a third temperature, e.g. 85-95° F., one or more cooling panels are opened to cool the system, and a fan (38) in the interior of the hydroponic system is activated. Finally, the movable panels in the second group are closed at a fourth temperature, e.g., 75° F. or higher and the fan is deactivated to avoid further cooling.

D. Two Compartment Hydroponic System

In another alternative, shown in FIGS. 3 and 4, the invention is directed to a hydroponic system comprising a support structure with at least two separate compartments, A (39) and B (40), separated by a wall (41) and having sides or walls that create an inner enclosed space from the outside environment. The sides or walls have an inner surface that abuts the internal enclosed area and an opposite outer surface that abuts the external environment. The inner enclosed space is accessible from the outside environment by a sealable opening in a side or wall of the support structure.

Compartment A

Compartment A is in the foreground of FIG. 3 and comprises one or more moveable panels (5) integrated into the top of the compartment. When moved to an open position, a gap (6) is formed in the top that allows the passage of air and sunlight from the outer environment into the enclosed inner space of compartment A. When in a closed position, the panels integrate into the top to seal the gap and prevent heat loss.

Beneath the gaps formed when top panels are open, is an insect screen (8) affixed to the inner surface of the top of the compartment and positioned to cover the gap (6). The mesh allows the passage of air and sunlight but prevents insects from passing from the outer environment into the inner closed space of the system.

Compartment A also has one or more plant growth conduits (21) located below the gap formed when the moveable panel is open and comprising an upper surface with openings (24) that support pots or other vessels in which plants are grown and an inner plant growth channel through which nutrient fluid can flow (22). Plants are suspended in the plant growth conduit so that they are exposed to sunlight that has passed through the gap (6) created when the movable top panel (5) is open and have roots that extend into the plant growth channel where they contact nutrient fluid. As in FIGS. 1 and 2, the plant growth conduit has a fluid receiving end that is in fluid communication with the nutrient fluid dispensing end of the nutrient fluid channel (in compartment B) such that nutrient fluid may flow through one or more ports located at the fluid dispensing end of the nutrient fluid channel and through one or more ports at the fluid receiving end of the plant growth channel; The plant growth conduit has a fluid dispensing end opposite the fluid receiving end, that is positioned to receive fluid that has passed through the plant growth channel and direct it to a fluid recovery conduit (25).

The recovery conduit receives fluid from the dispensing end of the plant growth channel and directs it to a nutrient fluid reservoir (16). A pump or pressurized tank receives nutrient fluid from the reservoir and is in fluid communication with the nutrient fluid receiving end of the nutrient channel (12) in compartment B through an ascending nutrient fluid conduit (18).

Compartment B

Compartment B is in the foreground of FIG. 4 and comprises one or more moveable panels (5) integrated into its top. When moved to an open position, a gap (6) is formed in the top that allows the passage of air and sunlight from the outer environment into the enclosed inner space of compartment B. When in a closed position, the panels integrate into the top to seal the gap. The panels comprise insulation such that when the panel is in the closed position, the gap is filled with the insulation to prevent heat loss from compartment B;

Compartment B also has a nutrient fluid channel similar to that in FIGS. 1 and 2, which comprises a top planar element (9) and a bottom planar element (10) that are joined at their ends and along their sides to form a nutrient fluid channel (12) through which fluid can flow. The top and bottom planar elements are located below an insect screen (8) and run longitudinally with all or part of the top wall.

The top planar element is closer to the insect screen and above the bottom planar element. It permits the passage of both sunlight and air through pores (11). The bottom planar element may or may not allow the passage of sunlight, but it does not permit the passage of nutrient fluid.

The nutrient fluid channel has a nutrient fluid receiving end (13) and an opposite nutrient fluid dispensing end (14) each optionally having one or more ports through which fluid can flow.

Wall Separating Compartment A and Compartment B

The hydroponic system has a wall (41) separating compartment A from compartment B with openings (42) and (43) that permit nutrient fluid to pass between the compartments.

As in the systems of FIGS. 1 and 2, the top planar element is perforated with holes to allow for the passage of air and is made of plastic or glass with a transmittance for sunlight of at least 80-95%. The top and bottom planar elements are held in position by brackets at each end of the nutrient fluid channel, and should be parallel. They should have a 0.5-3.0 cm thickness and be separated by a distance of 0.5-2.5 cm.

The panels in the tops of compartments A and B should be hinged to permit them to open and close easily, and the gap formed when the panels are in the open position should be separated from the interior of the structure by an insect screen with mesh having a pore width of 0.4-1 mm, or a 20×20 mesh size.

The plant growth conduits in the system may take many forms, but preferably, they are in the form of rectangular boxes with holes in the top that support pots or other vessels for the growth of plants.

Some systems may include an aeration pump that supplies air to the nutrient fluid and the pump may be replaced with a pressurized tank.

The opening and closing of panels in the tops of compartments A and B may be controlled electronically and the hydroponic system may have a thermostat (33) that automatically controls the position of the panels based on temperature changes either in the enclosed interior space of one or both compartments or the outside environment.

Optionally, the system may include elements for the cooling of the system if the interior temperature becomes excessively hot, e.g., it rises above 90 or 95° C. The cooling elements may include a fan under the control of the thermostat and at least one additional movable panel that does not have a reflective surface and responds to temperature changes.

E. Methods for Growing Plants Hydroponically

The invention is also directed to growing plants hydroponically using any of the systems described herein. Plants may be used to produce a wide range of products, including fruits, vegetables, flowers, legumes, herbs (including medicinal herbs), and spices. The method is performed by suspending pots or other vessels in the holes (24) of one or more plant growth conduits (21) in a hydroponic system described herein, wherein the pots or vessels contain the plants. Nutrient fluid in the nutrient fluid reservoir is then circulated in the system by activating a fluid pump that draws fluid from the reservoir and then circulates it through the system. The system is heated or cooled during the process to maintain conditions suitable for plant growth using the methodology and hydroponic system elements discussed above. Plant growth is monitored, and additional nutrient fluid is added as needed. When the growth of plants is complete, the process is terminated, and the desired products are collected.

The methods described above may be used in an environment where, on average, there is at least a 20 degree daily fluctuation in temperature, and the circulation of nutrient fluid should take place for 12 to 24 hours a day at a flow rate of about 1-2 liters per minute per growth conduit.

BRIEF DESCRIPTION OF THE DRAWINGS

FIG. 1: FIG. 1 is the simplest design and is characterized by the use of a recirculating nutrient fluid that both provides nutrition to plants and heats the system. Nutrient fluid flows through a nutrient fluid channel (12), where it is warmed and aerated from exposure to sunlight when movable panels (5) at the top of the system are in open positions. There is also one movable reflective panel (26) in a side wall (27) with an inner surface (31) reflecting sunlight into the system's interior.

FIG. 2: FIG. 2 shows a system that is similar to the system in FIG. 1 except that, in addition to the movable panels in the top (5) and side (26), there are one or more panels (36) that are used for cooling the system. Cooling is also promoted by a fan (38) mounted on the inner surface of end wall (27). Both the movement of the cooling panel (36) and the fan's activation is controlled by a thermostat (33).

FIG. 3: FIG. 3 is a front view of a hydroponic system with two compartments. The system's front wall (34) has been omitted to allow the components inside the system to be seen. The figure shows compartment A, where the growth of plants takes place. Compartment B (40) is in the back of compartment A and a wall (41) separates the two. Unlike the systems shown in FIGS. 1 and 2, the nutrient fluid channel is not directly above the plant growth conduits (21) but has been moved to compartment B.

FIG. 4: FIG. 4 shows the inside of compartment B. The nutrient fluid channel (12) is located in this compartment. It receives nutrient fluid pumped from compartment A through a hole (42) in the wall (41) separating the compartments. Next, the nutrient fluid passes through the nutrient fluid channel where it is warmed by sunlight through a gap (6) in the top of the compartment and aerated by air passing through pores (11) in the upper surface (top planar element (9)) of the nutrient fluid channel. After flowing through the nutrient fluid channel, nutrient fluid is pumped back to compartment A through an opening (43). It is then pumped through manifold (20) and into the plant growth conduits (21).

TABLE 1

Components Identified in Figures

Figure 1:
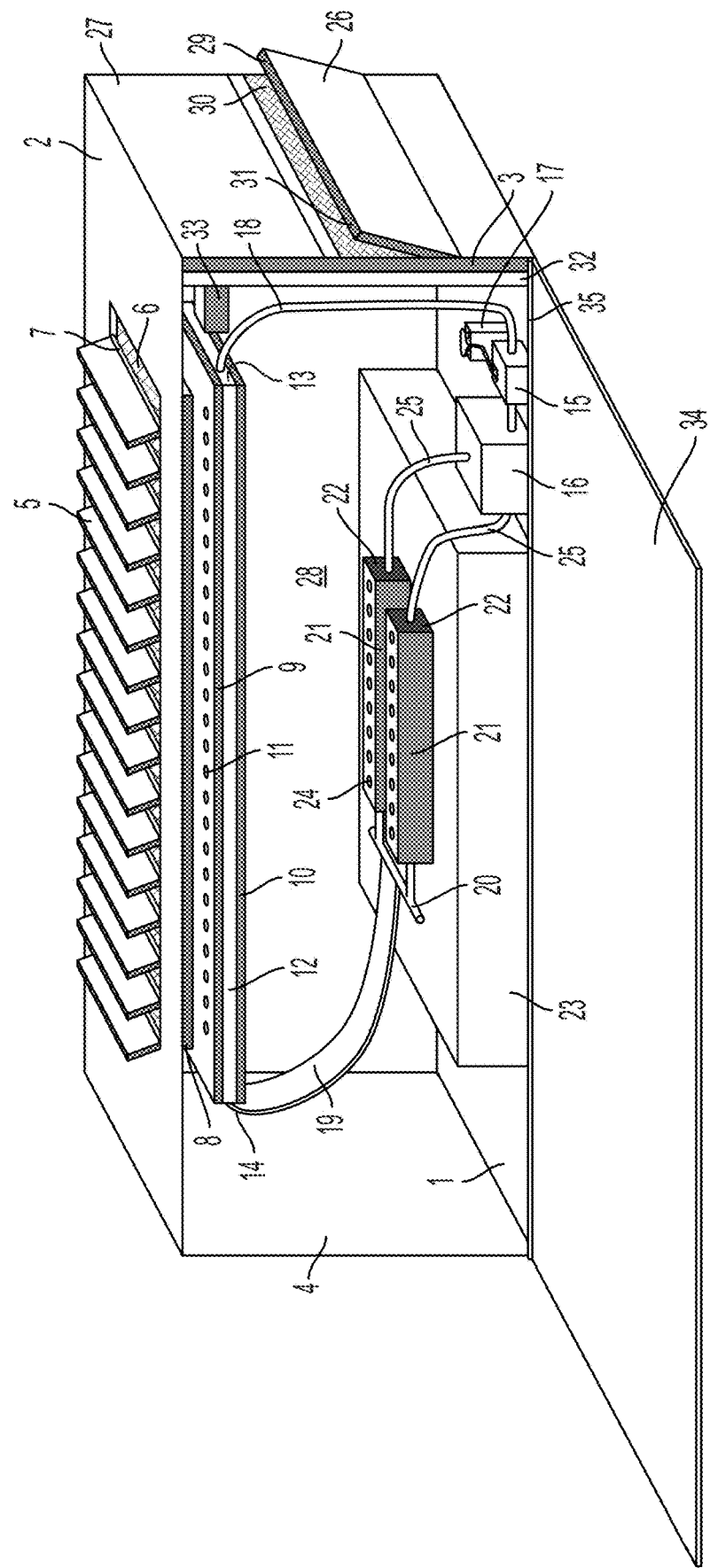
FIGS. 1-4 show different designs for hydroponic systems. The reference numerals in the figures are defined below in Table 1.

| Reference Identifier | Description |
|---|---|
| FIG. 8-1 | |
| 1 | bottom side of support structure |
| 2 | top side of support structure |
| 3 | end wall with moveable panel |
| 4 | end wall opposite end wall (3) |
| 5 | heating panels in top side (2) of support structure that can be moved to an open or closed position |
| 6 | gap formed when heating panels are in the open position |
| 7 | hinge which a heating panel pivots on to open or close |
| 8 | insect screen affixed to the inner surface of the top side of the support structure |
| 9 | top planar element |
| 10 | bottom planar element |
| 11 | pores in top planar element that allow air to pass through |
| 12 | nutrient fluid channel formed using the top planar element as a top side, and the bottom planar element as the bottom side |
| 13 | fluid receiving end of the nutrient fluid channel; this may optionally include one or more ports to help direct fluid into the channel |
| 14 | fluid dispensing end of the nutrient flow channel; this may optionally include one or more ports to help direct fluid out of the channel |
| 15 | fluid pump |
| 16 | nutrient fluid reservoir |
| 17 | battery |
| 18 | ascending nutrient feed tube for delivering nutrient fluid from the nutrient fluid reservoir to the fluid receiving end of the nutrient flow channel; this may optionally connect with a port aiding flow into the channel |
| 19 | descending nutrient fluid conduit directing nutrient fluid from the fluid dispensing end of the nutrient flow channel (optionally through a port) and to a manifold leading to plant growth conduits |
| 20 | manifold at the fluid receiving end of the plant growth channel |
| 21 | plant growth conduits |
| 22 | growth channels running through the plant growth conduits |
| 23 | support table for plant growth conduits |
| 24 | openings in the upper surface of the plant growth conduits which may hold pots or other vessels for growing plants; the tops of the plants are positioned to receive sunlight when the movable panels in the top are open; the roots of the plants extend into the plant growth conduit and contact flowing nutrient fluid |

TABLE 1-continued

Components Identified in Figures

| Reference Identifier | Description |
|---|---|
| 25 | recovery conduits in which fluid is transferred from the fluid dispensing end of the plant growth channels to the nutrient fluid reservoir |
| 26 | reflective panel in end wall (3) |
| 27 | outer side of end wall (3) |
| 28 | interior enclosed space created by support structure |
| 29 | space between outer and inner surfaces of reflective panel on end wall (3) |
| 30 | gap covered by an insect screen that passes reflected sunlight into the interior of the hydroponic system when panel (26) is in the open position; |
| 31 | inner surface of panel 26 |
| 32 | optional column or container of heat-absorbing fluid or other material that absorbs thermal energy when exposed to sunlight and emits thermal energy in the absence of sunlight |
| 33 | thermostat |
| 34 | front wall of support structure in open position |
| 35 | hinge of front wall (34) |

FIG. 8-2

| | |
|---|---|
| 36 | cooling panel on wall (3) |
| 37 | gap formed when panel (36) is in the open position |
| 38 | fan mounted on the interior surface of end wall (3) |

FIG. 8-3

| | |
|---|---|
| 39 | compartment A- containing plants |
| 40 | compartment B- containing nutrient fluid channel |
| 41 | wall separating compartment A from compartment B |
| 42 | first opening in wall |
| 43 | second opening in wall |

FIG. 8-4

| | |
|---|---|
| 44 | table for storage |
| 45 | movable panel in side wall |
| 46 | space between inner and outer surfaces |
| 47 | gap covered by insect screen |

Definitions

Hydroponic(s): the term "hydroponic" refers to a method of cultivating plants in which nutrients are supplied in a fluid medium in the absence of soil. There are many texts that describe all aspects of hydroponics, and that can be employed in connection with the present invention including: Raviv, et al., Soilless Culture Theory and Practice, 2$^{nd}$ edition, Academic Press, Cambridge, MA (2019); Geilfus, Christoph-Martin, Controlled Environment Horticulture: Improving Quality of Vegetables and Medicinal Plants 1st ed. Springer (2019); and Jones, J. Benton, Jr., Complete Guide for Growing Plants Hydroponically CRC Press (2014).

Nutrient fluid: Nutrient fluids for the growth of different types of plants are well known in the art of hydroponics and may either be formulated immediately before use or stored in a form ready to use. Many guides are available online that provide specific formulations for different plant varieties. The temperature of the nutrient fluid should be kept n the range of about 65-85° C., and the pH should be about neutral, 6.5-7.5.

Support structure: This term refers to any structure that creates an internal space separated from the outside environment and suitable for hydroponics. A rectangular six-sided cuboid or a cube may be used as described herein. However, alternative shapes are also possible. The main factor of importance is that it is large enough to accommodate the hydroponic equipment used inside and permits easy access to the equipment so that a user can operate it.

Wall/side: These terms are used interchangeably. They can, for example, be made from "all-weather" panels, wood, fiberglass, metal, or any other material that is sturdy enough to withstand the environment where a hydroponic system is used. Materials that have low thermal conductivity are preferred or that have insulating material integrated into their structure. However, a separate insulation layer may also be used to line the inner surface of sides/walls.

Movable panels: The terms "slat" and "panel" are used synonymously herein. The panels are integrated into a wall of the structure and may be made out of the same material as the wall. They must be hinged or otherwise designed to be raised. The inner side of panels may be lined with insulation material, or insulation material may be integrated into the panel itself. When open, the panels should create a wall gap exposing the hydroponic system's inner area. When closed, the panels should snugly fill the gap to restore thermal insulation. Panels may be moved either manually or electronically.

Insect screen: Insect screening should be attached to the interior side of walls having movable panels or to cover the gaps that form when the panels are in the open position. Generally, fine wire or plastic mesh screens should be used in insect screening with a pore width of, for example, 0.4-1 mm or a 20×20 mesh size. The screening should completely cover gaps and be tightly sealed to the interior surface of the wall.

Planar elements: The top and bottom planar elements are below the insect screen. They are connected at their ends and sealed with a barricade along their sides to form a wide channel through which fluid can traverse. The elements should be made of a material (typically glass or plastic) with a high light transmittance (e.g., 80-95% see PLEXIGLAS® multi-skin). The sheets are preferably thin (e.g., 0.5-3.0 cm thick) and rigid. They should run parallel to the top side of the support structure and may be held in position with brackets at either end. Top and bottom planar elements should be parallel to one another and should be sealed together along their sides, e.g., using a strip of plastic and adhesive to prevent fluid from escaping. The distance between the top and bottom planar elements is not critical but 0.5-2.5 cm would be reasonable in most applications. The ends of the planar elements forming the nutrient fluid channel may be fitted with one or more ports to facilitate fluid flow into and out of the channel. The top planar element, but not the bottom, should be perforated along its length with small holes to facilitate the passage of air.

Figure 2:
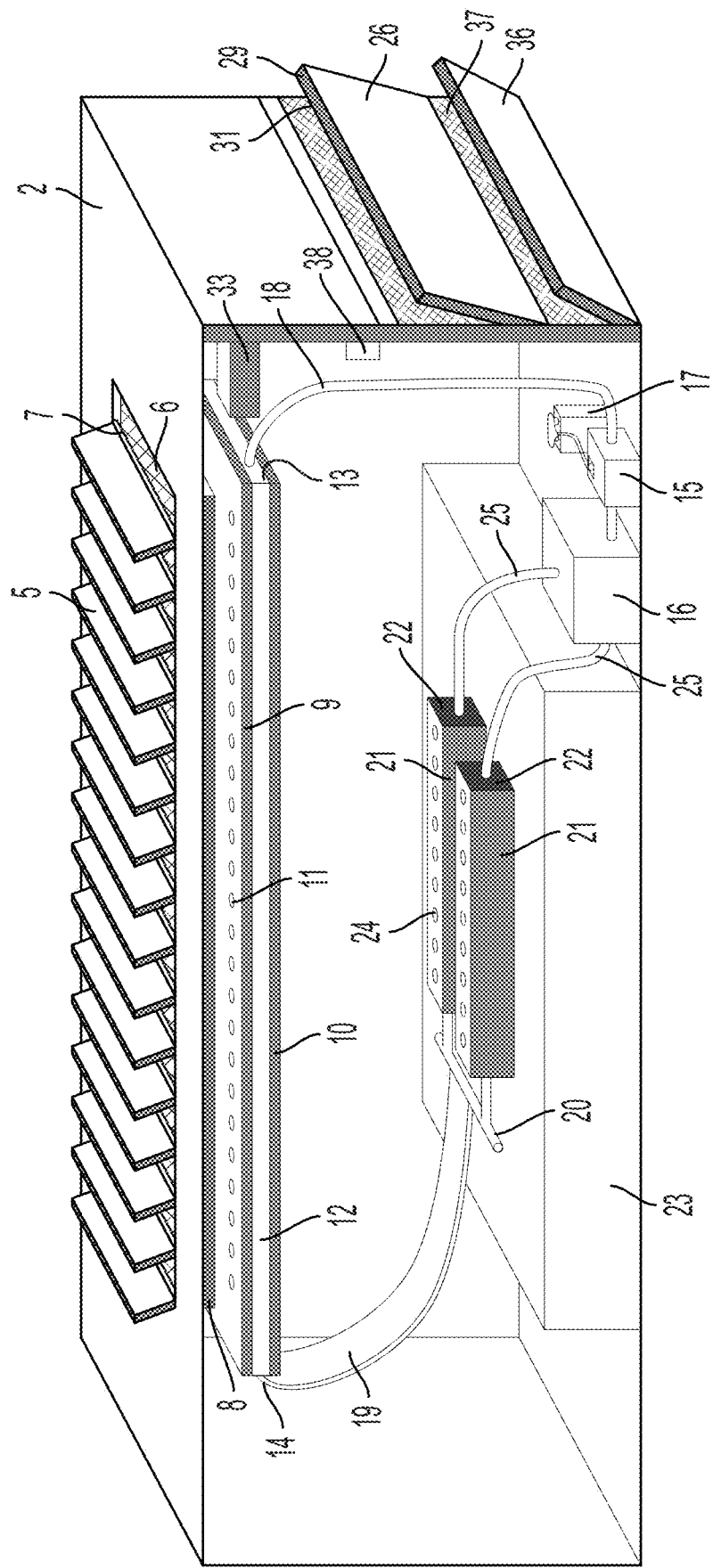
Figure 3:
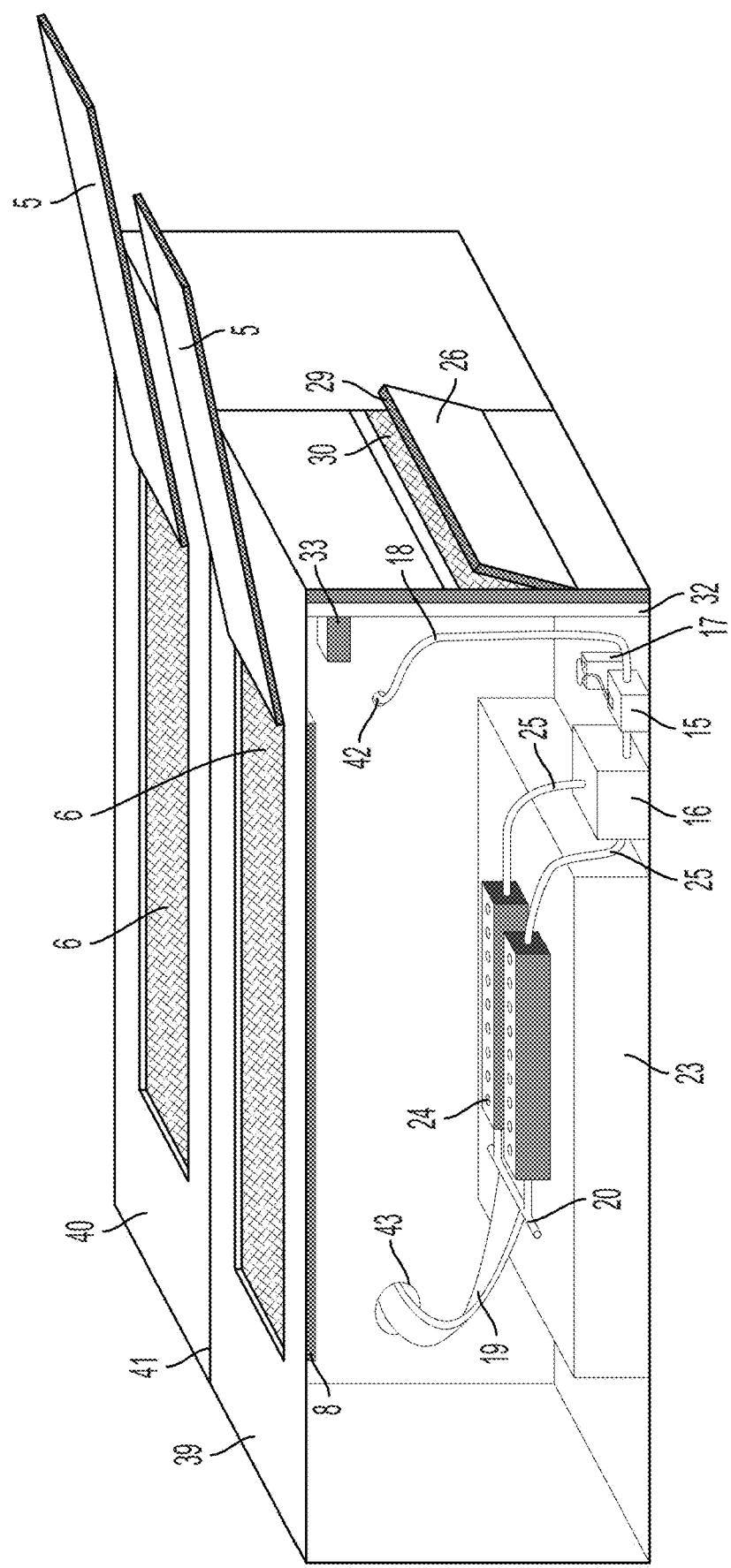

Plant growth conduits: plant growth conduits have two main functions. The first is to support pots or other vessels where plants can grow while exposed to radiant energy from sunlight. The second function is to expose the roots of the plants to nutrient fluid. In FIGS. 1-3, the plant growth conduits are essentially rectangular boxes with holes in the top side that are used to support the pots or other vessels. A flow channel runs along the length of the boxes which transports nutrient fluid obtained from the nutrient flow channel to a nutrient flow reservoir. As the nutrient flows through, it makes contact with plant roots that hang down from the pots or vessels suspended in the holes on the top of the growth channel. The end of the plant growth channel that receives fluid may be fitted with a manifold that evenly distributes the nutrient flow fluid from the nutrient flow channel to each plant growth conduit.

Pump: Any pump commonly used in hydroponics may be used in connection with the current invention. The flow rate of the nutrient fluid should be about 1-2 liters per minute per growth conduit. As an alternative to a liquid pump, fluid may be propelled using a pressurized gas.

Aeration: Aeration in the context of the present invention is the supply of air to plants, typically as part of the nutrient fluid. Aeration of the nutrient fluid should take place as the nutrient fluid passes through the nutrient flow channel. However, additional air may be provided by an air pump located in the nutrient fluid reservoir if needed. A pump that supplies about 0.5 to 2 liters of air per minute for every 4 liters of nutrient fluid should generally be appropriate.

DETAILED DESCRIPTION OF THE INVENTION

Hydroponic System

The basic elements of the hydroponic system are shown in FIG. 1. The system has a generally square or rectangular cuboid support structure which defines an inner enclosed space (28) that is separated, but accessible from the outside. In the figure, this structure is characterized by a bottom side (1), a top side (2), and a back side (not shown). In addition, the figure has two end walls (3) and (4). The exact dimensions of the structure are not critical. The main requirement is simply that it be big enough to support equipment for hydroponically growing plants and provide access to a user running the system. By way of example, a small scale hydroponics system might have a length of 3-10 feet, a width of 3-8 feet and a height of 4-8 feet. A larger system may be equipped with an entrance allowing a person to enter inside and have a length of 5-15 feet, a width of 5-15 feet and a height of 6-8 feet.

Access to the inside of the system for a small structure could be through a sealable opening or panel on the front side, rear side, or on an end wall of the structure. Alternatively, an entire wall might be constructed so that it can easily be removed or placed on a hinge to rotate to make this interior accessible (34). Finally, a large device might have a hinged or sliding door that can be opened to permit access by a person and then closed. The invention, however, is also compatible with other types of access.

The outer walls (i.e., the top (2), bottom (1), front, back and ends ((3) and (4))) should have an outer surface that is rigid, waterproof and sturdy enough to withstand the elements of the environment where the system is placed. For example, the walls may be made of all-weather insulation panels in which insulating material is part of the panel. Alternatively, ordinary all-weather panels may be used, and different insulating material may be attached to the interior surface of the panels or positioned immediately behind the interior surface. Any standard insulating material may be used for this purpose, including insulating foams, aerogels, or polymers such as polyurethane or polystyrene. The exact thickness of the insulation will vary depending on the particular environmental conditions where the system will be used, but a thickness of 0.25 to 4 inches or 0.5 to 2 inches would not be unexpected.

The top (2) of the system has one or more movable warming panels (5) that may be opened or closed. When in the open position, a gap (6) is exposed which permits sunlight and air to pass freely through the opening and into the interior (28) of the structure. When closed, grooves in the movable warming panels may engage one another to form a snug seal. However, unlike grooves in other panels of the structure, those in the portable panels must allow for panel opening, and one side of the panel must act as a hinge (7).

The device includes an insect screen (8) with a mesh that allows air passage but prevents the passage of insects and debris. This is affixed to the inside surface of the top of the device and completely covers any gaps formed when the movable panels (5) are open. The screen will typically be metal or plastic, but other materials may also be used. Any means may be used to affix the screen to the inside surface of the top, including staples, adhesives, tacks, nails, brackets, etc.

Immediately below the insect screen (8) are two rectangular planar elements. The top planar element (9) is a pane made of glass, plastic, or some other material that allows the passage of sunlight and has pores (11) that allow the passage of air. The bottom planar element (10) is also a pane made of glass, plastic, or some other material that allows the passage of sunlight. This may be permeable to air but must not be permeable to the nutrient fluid used to nourish plants inside the system. The top planar element (9) and the bottom planar element (10) together form a nutrient fluid channel (12) with sides that provide a barrier to keep in fluid. During operation, nutrient fluid flows through the nutrient fluid channel (12), passing from the receiving end (13) to the dispensing end (14).

At each end of the nutrient channel, there may be an end piece, e.g., a bracket, that holds planar elements at a fixed distance. Optionally the ends of the nutrient channel may be partially sealed and include one or more ports facilitating the flow of fluid into the nutrient channel at the fluid receiving end and the flow of fluid out of the nutrient channel at the fluid dispensing end. During deployment of the device for plant growth, a liquid pump (15) propels nutrient fluid from a fluid reservoir (16) up an ascending nutrient fluid feed tube (18). The pump may be electrical, e.g., receiving power from a battery, or may be replaced with a pressurized tank. If desired, a hand pressure tank (i.e., a tank in which pressure has been created manually) may be used with a pressure regulator to control the fluid flow rate. This has the advantage of avoiding the need for electricity to pump nutrient fluid. If panels in the device are operated manually, the need to use electricity may be avoided entirely. Once the nutrient fluid exits the pump, it passes through the nutrient fluid channel (12). During periods of daylight, the movable warming panels (5) at the top of the system (2) are in the open position to allow nutrient fluid to be aerated and warmed by sunlight as it passes through.

At the dispensing end of the nutrient fluid channel (14), the nutrient fluid is directed to a descending fluid conduit (19), where it flows to an optional manifold (20) and then to the fluid receiving end of one or more hydroponic plant growth channels (22) running through plant growth conduits (21). As shown in FIG. 1, the plant growth conduits may rest on a support table (23), and if gravity is used to aid fluid flow, the conduits should be slightly elevated at the end where nutrient fluid enters.

The plant growth conduits (21) have holes in their upper surface (24) in which pots or other vessels containing plants are suspended. The roots of the plants extend down into a stream of nutrient fluid as it passes through the plant growth channel. At the fluid dispensing end of the plant growth conduits (21), the nutrient fluid passes into recovery conduits (25) and back to the nutrient fluid reservoir (16). This circulation of nutrient fluid may occur continuously or intermittently (e.g., for 2, 4, 6, 8 or 12 hours per day) during the growth of plants.

An end wall of the device (3) may optionally include one or more movable reflective panels (26) which open like the movable top panels (5). These also have an all weather exterior surface (27) and preferably have insulating material sandwiched between the exterior and interior surfaces (29). The interior surface of the reflective side panels should either be made of a material that reflects sunlight or have such a material (e.g., mylar) attached to it.

When in the open position, the inner reflective side of panel (26) forms an angle with the end wall of up to 50 degrees to reflect sunlight from the movable panel's interior surface to the system's interior (28). Optionally, the reflected sunlight will contact a column or other container (32) that extends either entirely or part of the way from the bottom of the system (1) to the top of the system (2) and which is made of, or contains, material that retains heat. Alternatively, the column or container may be omitted, and the sunlight allowed to contact the ascending fluid conduit (18) to warm nutrient fluid flowing inside. During daylight, the movable side panel may be moved to an open position to reflect sunlight into the inner enclosed space of the system and stored by a structure that retains heat (32). At night, the movable panel may be closed to insulate the system's interior (28) from the cold, while the structure (32) passively radiates the heat absorbed during the day.

The top movable warming panels (5) and the side movable reflective panels (26) may be opened and closed manually. However, they may also be controlled electrically using a thermostat with a sensor that measures environmental temperature and which, in response to changes in temperature, activates a circuit that opens or closes the top movable warming panels (5) and/or the reflective side panel (26). For example, in response to an outside temperature of 75° F., the thermostat may activate a circuit that opens the panels like electrically controlled Venetian blinds. When the temperature falls below 75° F., the circuit may cause the panels to close.

In FIG. 1, the thermostat (33) is shown as being inside the system with a sensor measuring outside temperature. However, other arrangements are also possible. For example, the thermostat may be designed to respond to changes in temperature inside the system (28), or the thermostat may be positioned outside the system and connected to an electrical circuit that controls panel position. The top movable panels and the movable side panels do not necessarily need to be on the same circuit or respond to the same changes in temperature. For example, thermostat settings may be chosen so that the top panels open when the temperature outside reaches 75° F. and close when the outside temperature falls below 75% F. The side panels may open or close in response to different temperatures.

Alternative Hydroponic System-1

An alternative system is shown in FIG. 2. It is similar to the system described above, except that it is designed to maintain a temperature high enough to promote plant growth and cool the system should it become excessively hot. As shown in the figure, the end wall of the system has two movable all weather panels. Panel (26) is the same as described above. When closed, the panel rests in a pocket (30) and helps to insulate the system from the environment. The back surface of the pocket is formed by either a pane that is transparent to sunlight or a screen with a mesh that allows the passage of air but prevents the passage of insects. The pane or screen may be part of the end wall (27) or affixed to the wall's inner surface. When in the open position, the movable side panel's interior surface reflects sunlight into the system's interior (28), thereby promoting warming. In the system shown in FIG. 1, the reflected sunlight is shown as contacting a wall made of, or containing, material that retains heat. That wall has been omitted from FIG. 2, although it may still be present provided it does not substantially interfere with airflow.

In addition to the movable reflective panels for heating the system, there may also be side panels used for cooling (36). Like the heating reflective side panels, the cooling panels nest in a compartment (37) in the end wall when in the closed position. The back part of the compartment may have a screen firmly affixed to the interior surface of the end wall (3). The screen is present to allow air to enter and circulate in the system freely and has a mesh that prevents the passage of insects. To further promote cooling and airflow, the system may include a fan (38) shown affixed to the side wall (3).

The cooling and heating panels may be opened and closed independently and be positioned manually or automatically using one or more battery-powered thermostats. For example, the heating panels may be opened when the outside temperature rises above 75° F. and closed when the temperature falls below 75° F. whereas the cooling panels may be opened if the interior temperature of the system increases above 90° F. and concurrently, the fan may optionally be activated. The cooling panels may be closed, and the fan turned off if the interior temperature falls below 85° F. These panels will typically be on separate circuits and may be controlled by a single thermostat or more than one thermostat. By independently opening and closing warming and cooling panels, the temperature inside the system can be better controlled. Although not shown in the figure, other walls, e.g., end wall (4), may also have heating and/or cooling panels.

Alternative Hydroponic System-2

A second alternative hydroponic system is shown in FIG. 3. This is similar to the original hydroponic system of FIG. 1, with a few differences. Specifically, there are now two compartments in the system designated as compartment A (39) and compartment B (40). Compartment A is in the foreground of FIG. 3, and compartment B is in the foreground of FIG. 4. There is a wall (41) that completely separates the two compartments except for two openings (42) and (43). One is used to transport nutrient fluid from compartment A through conduit tubing to compartment B; the other carries fluid from compartment B to compartment A. The nutrient fluid channel is no longer over the plants but has been moved to the top of compartment B.

As in the systems of FIGS. 1 and 2, a pump (15) draws nutrient fluid from a reservoir (16) and circulates it through an ascending nutrient tube (18); through the nutrient fluid channel (12); through a descending nutrient fluid conduit (19); through the plant growth channel (22) of one or more plant growth conduits (21) where it contacts the roots of plants; and v) back to the nutrient fluid reservoir (16). The nutrient fluid channel is no longer above the plants but at the top of compartment B. Thus, the nutrient fluid must exit compartment A through an opening (42) in the wall (41) separating the compartments and, after traversing the nutrient fluid channel (12), it must enter back into compartment A through a second opening (43) in the wall (41). On the top of compartment A is a hinged cover (5) that forms a gap when in the open position (6). Below the gap (6) is an insect screen (8) affixed to the underside of the top wall of compartment A in a manner that prevents the entry of insects. The inner surface of the cover (5) has insulating material, such that when the cover is closed, it fits snugly into the gap (6), and the insulating material is positioned to thermally insulate compartment A in the area of the gap.

Figure 4:
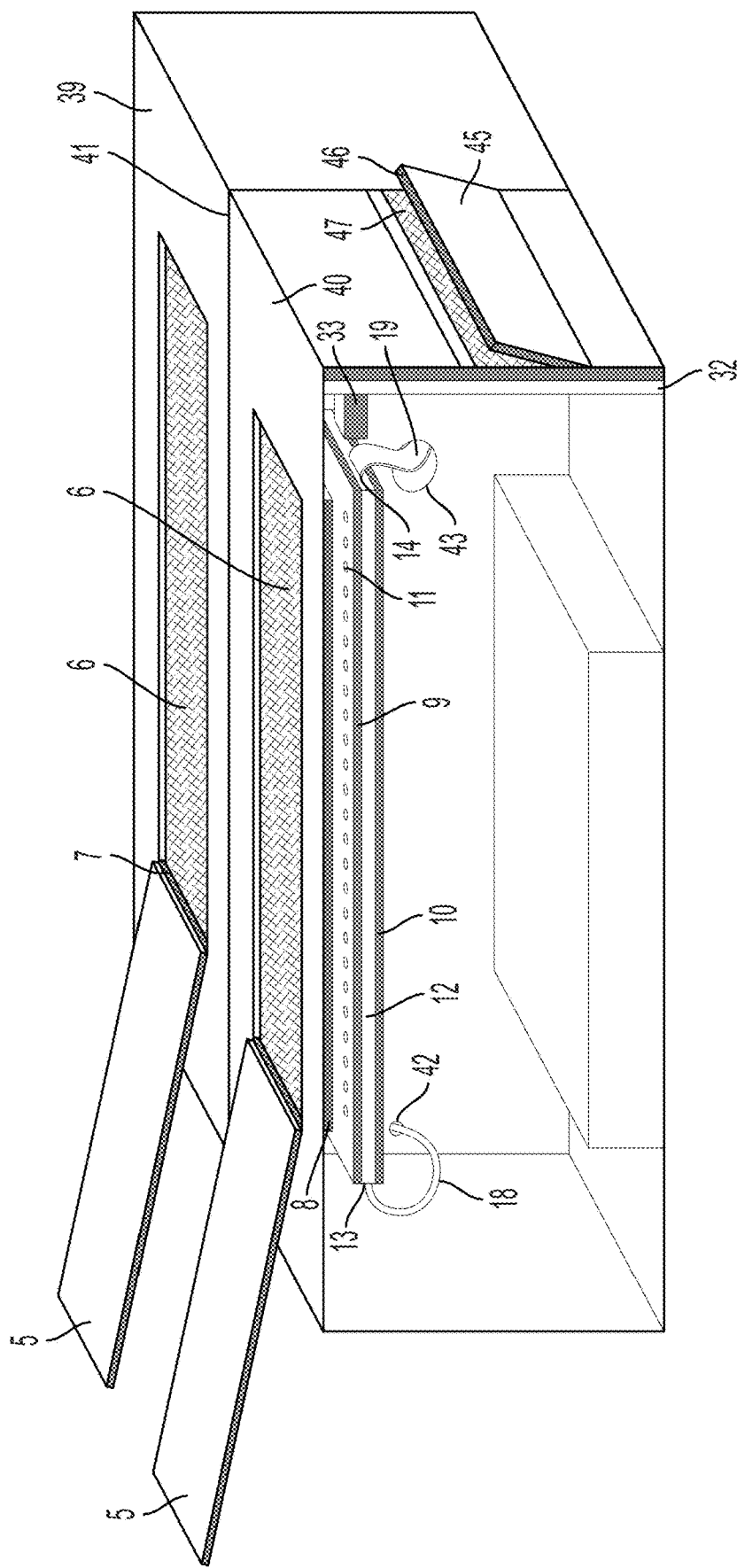

The nutrient fluid channel (12) in compartment B has the same physical and functional characteristics as described in connection with the devices of FIGS. 1 and 2. As shown in FIG. 4, the space inside compartment B no longer contains plants and other equipment. This area may therefore be used for storing various materials. The area could also be used for preparing plants, nutrient fluid, or other materials. As with the device in FIG. 3, there may optionally be a cooling panel (26) present and a thermostat (33) for monitoring temperature.

All references cited herein are fully incorporated by reference. Having now fully described the invention, it will be understood by one of skill in the art that the invention may be performed within a broad and equivalent range of conditions, parameters and the like, without affecting the spirit or scope of the invention or any embodiment thereof.

What is claimed is:

1. A hydroponic system comprising:
   a) a support structure that has at least two separate compartments, A and B, separated by a wall and wherein the support structure has sides, including a top side ("top") and a bottom side ("bottom"), that create an inner enclosed space separate from the outside environment;
   b) wherein compartment A comprises:
      i) one or more moveable panels that are integrated into the top of compartment A such that, when moved to an open position, form a gap that allows the passage of air and sunlight from the outer environment into the inner enclosed space of compartment A and, when in a closed position, integrate into the top to seal the gap;
      ii) an insect screen that is positioned to cover the gap formed when one or more of the moveable panels are in an open position, wherein the insect screen allows passage of air and sunlight but prevents insects from passing from the outer environment into the inner enclosed space of the hydroponic system;
      iii) one or more plant growth conduits located below the gap formed when the one or more moveable panels are open and comprising an upper surface with openings that support pots or other vessels in which plants are grown and an inner plant growth channel through which nutrient fluid can flow;
   c) wherein compartment B comprises:
      i) one or more moveable panels that are integrated into the top of compartment B such that, when moved to an open position, form a gap in the top that allows the passage of air and sunlight from the outer environment into the inner enclosed space of compartment B;
      ii) an insect screen that is positioned to cover the gap formed when one or more of the moveable panels are in an open position, wherein the insect screen allows passage of air and sunlight but prevents insects from passing from the outer environment into the inner enclosed space of the hydroponic system;
      iii) a nutrient fluid conduit;
   wherein the wall separating compartment A from compartment B has one or more openings through which the nutrient fluid conduit extends and that permits nutrient fluid to pass from compartment A to compartment B and back from compartment B to compartment A.

2. The hydroponic system of claim 1, further comprising: a nutrient fluid reservoir; a pump or pressurized tank for propelling nutrient fluid.

3. The hydroponic system of claim 1, wherein the support structure is a rectangular cuboid.

4. The hydroponic system of claim 1, wherein the moveable panels in the tops of compartments A and B are hinged to permit them to open and close easily.

5. The hydroponic system of claim 1, wherein each insect screen comprises a fine wire mesh with a pore width of 0.4-1 mm or a 20×20 mesh size.

6. The hydroponic system of claim 1, wherein the plant growth conduits are rectangular boxes with openings in the top that support pots or other vessels in which plants are grown.

7. The hydroponic system of claim 1, further comprising an aeration pump that supplies air to the nutrient fluid.

8. The hydroponic system of claim 1, wherein the opening and closing of the one or more moveable panels in compartments A and B are controlled electronically, and the hydroponic system further comprises a thermostat that automatically controls the opening and closing of the panels in response to temperature changes either in the enclosed interior space of one or both compartments or the outside environment.

9. The hydroponic system of claim 8, further comprising a fan inside the support structure that is under the control of the thermostat.

10. The hydroponic system of claim 1, further comprising one or more movable reflective panels located on one or more sides of the support, wherein inner surfaces of said reflective panels are coated with a reflective coating.

11. A method of growing plants in the hydroponic system of claim 1, comprising:
   a) suspending pots or other vessels in the openings of the plant growth conduits, wherein the pots or vessels contain the plants;
   b) providing the plants with nutrient fluid;
   c) monitoring the hydroponic system for plant growth and adding additional nutrient fluid as needed;
   e) terminating the growth of plants at a desired endpoint.

12. The method of claim 11, wherein the hydroponic system is in an environment where, on average, there is at least a 20 degree daily fluctuation in temperature.

13. The method of claim 11, wherein a pump circulates fluid from 12 to 24 hours a day.

14. The method of claim 13, wherein the flow rate of the nutrient fluid is about 1-2 liters per minute per growth conduit.

15. The method of claim 11, wherein during operation, the nutrient fluid is aerated using an air pump.

16. The method of claim 15, wherein the air pump delivers 0.5 to 2 liters of air per minute for every 4 liters of nutrient fluid.

\* \* \* \* \*